United States Patent [19]

Sistig et al.

[11] 4,061,848

[45] Dec. 6, 1977

[54] PROCESS FOR COOLING A POLYMERIZATION REACTOR

[75] Inventors: Eberhard Sistig, Marl; Karl-Heinz Reinermann, Dulmen, both of Germany

[73] Assignee: Chemische Werke Huls Aktiengesellschaft, Germany

[21] Appl. No.: 655,449

[22] Filed: Feb. 5, 1976

[30] Foreign Application Priority Data

Feb. 5, 1975 Germany ............................... 2504659

[51] Int. Cl.² ........................... C08F 2/04; C08F 2/18; C08F 2/22; C08F 2/12
[52] U.S. Cl. .................... 526/61; 23/253 A; 526/67; 526/68; 526/69; 526/70; 526/344
[58] Field of Search ....................... 526/61, 67, 68, 69, 526/70; 23/253 A

[56] References Cited

U.S. PATENT DOCUMENTS

| | | | |
|---|---|---|---|
| 3,356,667 | 12/1967 | Smith et al. | 526/61 |
| 3,578,649 | 5/1971 | Badguerahanian et al. | 526/61 |
| 3,708,658 | 1/1973 | Hopkins | 526/61 |
| 3,772,257 | 11/1973 | Bochum et al. | 526/61 |
| 3,794,471 | 2/1974 | Latinen | 526/68 |

Primary Examiner—Alan Holler
Attorney, Agent, or Firm—Craig and Antonelli

[57] ABSTRACT

A process for cooling a polymerization reaction of compounds in a dispersion and/or solution involves evaporation of one or more liquids contained in the dispersion and/or solution, condensation of the vapors in a reflux condenser, and recycling of the thus-condensed vapors into the reactor, together with the use of a controllable flow of coolant which is introduced into the reflux condenser jacket. In this process the amount of heat given off during condensation serves as the control variable for a controller for controlling the input of cooling medium for the reflux condenser.

11 Claims, 2 Drawing Figures

PROCESS FOR COOLING A POLYMERIZATION REACTOR

This invention relates to a process for cooling a polymerization reaction effected by compounds in a dispersion or solution contained in a reactor wherein the cooling is effected by the evaporation of one or more liquids contained in the dispersion and/or solution, condensation of the vapors in a reflux condenser, and recycling of the condensed vapors into the reactor, together with the use of a controllable flow of coolant through the reflux condenser jacket.

It is known in the polymerization technology to remove the occurring heat of reaction, for example, by way of the reactor walls or by heat-transfer means installed within the reactor. Cooling is likewise possible with the aid of a reflux condenser, wherein the condenser can be utilized by itself or in addition to other cooling devices.

The aforementioned cooling measures, however, do not as yet allow in all cases sufficient compensation for the temperature fluctuations occurring during the polymerization in the reactor.

Furthermore, a process is known from German published application No. (DAS 1,495,145) which maintains the polymerization temperature in the reactor constant by controlling the condensation velocity in the reflux condenser, wherein the change of the condensation relationships is effected by a control mechanism regulated by way of the polymerization temperature in the reactor. The internal reactor temperature thus serves as a control variable herein, for example preferably for a coolant cycle of the reflux condenser.

One disadvantage of this process is that the control procedure frequently does not permit a sufficiently rapid correction of the actual value to the desired value of the internal reactor temperature, especially if large polymerization charges are present, i.e. if large-scale reactors are employed having a capacity of, for example, 40 m³ to 300 m³. One reason for this is that the large volume of the coolant in the reflux condenser represents a system which is inert from the viewpoint of control technology.

The problem thus encountered is to find, for these purposes, a control system which operates practically without delay.

A process has been found for cooling a polymerization reaction of compounds in dispersion and/or solution, wherein the cooling is effected by the evaporation of one or more liquids contained in the dispersion and/or solution, by condensation of the vapors in a reflux condenser, and by recycling of the thus-condensed vapors into the reactor, and wherein cooling of the reactor is also effected by use of a controllable cooling medium flow, which process is characterized in that the amount of heat emitted during condensation serves as the control variable for a controller for controlling the coolant feed for the reflux condenser.

The emitted amount of heat, the heat of condensation, correlates with the temperature of the coolant in the reflux condenser. The temperature of the coolant in the reflex condenser is thus suitable as the control variable for the controller. This type of detection is preferably utilized.

The process of this invention can be generally employed in polymerization reactors with reflux condensation.

The high flexibility of the process of the present invention is based essentially on the fact that the temperature of the coolant is measured directly in the jacket of the reflux condenser and consequently any temperature change of the coolant due to absorption of the heat of condensation can be fed to the control system practically without delay.

The application of the process of this invention makes it possible to set practically the maximum or minimum cooling efficiency i.e. capacity or power of the reflux condenser within a minimally short time, i.e. about 1–2 minutes, and thus compensate for fluctuations of the internal reactor temperature during the course of the polymerization; the desired value can be maintained practically constant. The deviations as a rule are less than 0.2° C. and at most 0.5° C.

The invention relates likewise to a polymerization reactor wherein the heat of reaction is removed by combined jacket cooling and evaporative cooling, this reactor having at least one temperature measuring sensor in the coolant within the reflux condenser, the measuring value of this sensor being capable of controlling by way of a controller the cooling capacity of the reflux condenser. The coolant in the reflux condenser serves for cooling rising vapors to be condensed in the condensation chamber of the reflux condenser. It appears to be especially important that the principle of temperature measurement within the coolant of the reflux condenser can be expanded to the effect that, in the flow direction of the coolant within the reflux condenser several temperature measuring sensors are arranged one behind the other, the measuring values of which can be weighted, averaged, and put into a controller.

The determination of the number of measuring points and the weighted or biased averaging of the measuring values depends on very many factors. For example, the configuration and power or efficiency of the reflux condenser are decisive regarding whether the measuring values of the measuring points located in the zone of the inlet of the hot gases are to be biased or weighted higher than the measuring points located above these measuring points.

It proved to be especially advantageous for determining an average temperature value $T_m$ to effect an averaging of the resistance values $R_{T_3}$, $R_{T_4}$, $R_{T_5}$, $R_{T_6}$ (note FIG. 2) measured by four resistance temperature probes (e.g. Pt 100) according to the formula:

$$R_{T_m} = \frac{(R_{T_3} + R_{T_5}) \cdot (R_{T_4} + R_{T_6})}{R_{T_3} + R_{T_4} + R_{T_5} + R_{T_6}}$$

The averaged temperature can also be corrected by a suitable circuit, so that the value $T_{m\,corr}$ fed to the controller is substantially directly proportional to the cooling efficiency of the reflux condenser.

Moreover, the weighting or biasing factors of the individual measuring values can be varied during the measurement. This can be significant, for example, if a different condensation behavior of the reflux condenser can be observed with rising temperature.

The cooling medium for the reflux condenser can be withdrawn from the coolant cycle of the reactor jacket cooling system as shown in the accompanying drawings. However, the cooling medium can also be conducted in an open circulation. The control is preferably effected by way of throttling or expansion of the cross-section of the feed conduit.

In order to clarify further the basic aspect of the invention, the following detailed description is presented with reference to a non-limitative embodiment and to the accompanying drawing wherein.

Figure 1:
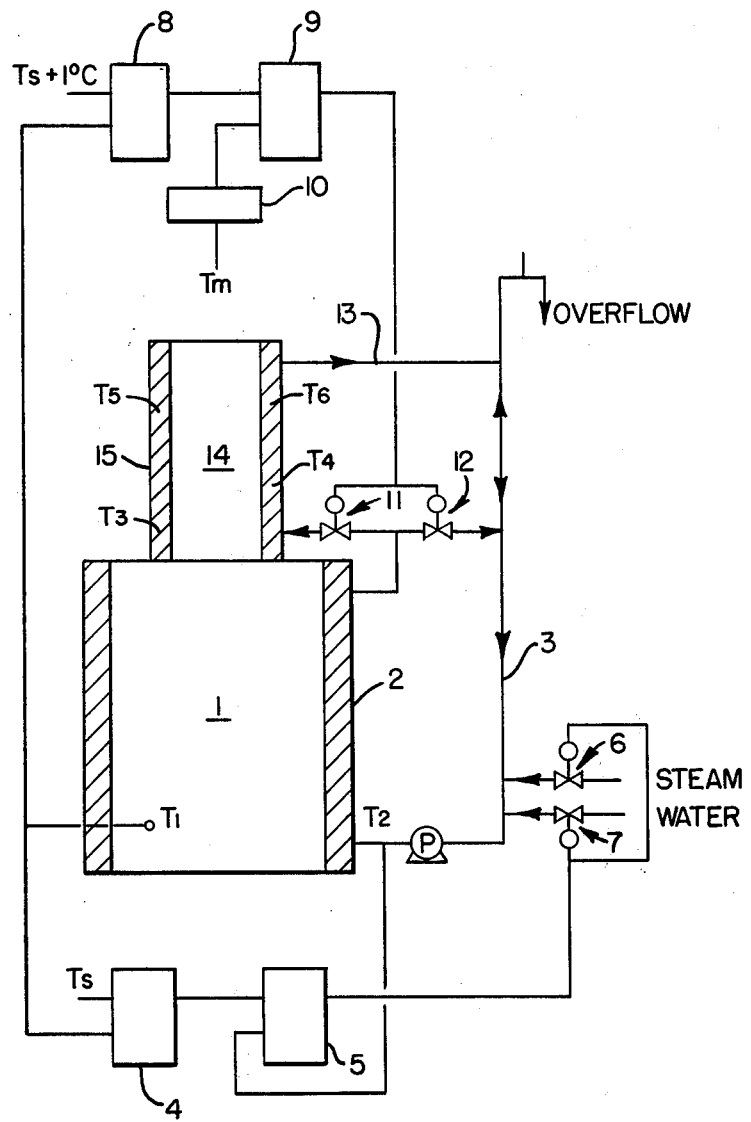
FIG. 1 shows a control scheme for a 100 m³ PVC reactor.

The reactor 1, shown schematically in FIG. 1 is a PVC polymerization reactor, the jacket 2 of which is connected to a coolant cycle 3. At the beginning of the polymerization, for example, the desired value $T_S$ of the controller 4 is set to the reactor temperature $T_1$ of 50° C. to be maintained during the polymerization. Besides, a temperature $T_2$ is measured in the feed pipe for the jacket cooling water. Via a cascade control system comprising a leading or first controller 4 and a trailing or second controller 5, the charging stream of steam and water through valves 6, 7 is controlled in a conventional manner. In detail, the conventional control process takes place as follows: If, in the leading controller for the jacket temperature, the actual temperature $T_1$ deviates from the desired temperature $T_S$, the trailing controller is fed with a new desired temperature which is compared with the actual temperature $T_2$. Due to the fact that the cooling water jacket temperature $T_2$ is additionally employed as the reference magnitude or value, a more rapid and more accurate control procedure can be accomplished than in case only the reactor temperature $T_1$ is introduced as the measuring variable. The jacket cooling capacity is desired so that, with the reaction in the reactor being in full swing, i.e. fully reactive, the temperature of the reactor will rise further. When a certain, set temperature limit has been exceeded, which limit can be, for example, at 51° C., the reflux condenser control system takes over the adjustment of the required additional cooling power or capacity.

The temperature $T_1$ measured in the reactor is fed to a further leading or first controller 8 for the reflux condenser, which has fed thereto at the same time the temperature $T_S + 1°$ C. (which in this example equals 51° C.) as the desired value. If the actual value $T_1$ deviates from the desired value of the leading controller 8, then the desired value is adjusted in a trailing or second controller 9. The actual value $T_m$ of the temperature in the reflux condenser fed to the trailing controller 9 passes through a correction circuit 10 (which may be the type illustrated in FIG. 2) wherein an extensive proportionality is attained between the change of the actual value $T_m$ of the temperature of the reflux condenser and the power produced by the reflux condenser, i.e. the capacity of the condenser. The value produced in the second controller 9 controls the valves 11, 12 and thus the conduit 13 for the cooling water which charges the jacket 15 of a reflux condenser 14. In the present example, the amount of cooling water for the reflux condenser is withdrawn from the cooling water cycle for the cooling jacket of the reactor. Since this water essentially has a constant temperature of, for example, 25° C. and is available in large quantities, it is possible to change the jacket temperature for the reflux condenser quickly with the aid of this water. The cooling water conduit 13, however, can also be controlled independently of the jacket cycle, namely as an open as well as a closed system.

The circulation in the jacket 2, in contrast thereto, remains almost constant and is only affected by the additional flow resistance of the reflux condenser.

It is an essential aspect of the invention that the temperature value $T_m$ is determined by measuring the coolant temperature in the jacket 15 of the reflux condenser. For this purpose, the temperature can be determined at a single location and equated to $T_m$. However, $T_m$ can also be determined as an averaged temperature from several measuring points. For example, if four measuring points are provided having temperature values $T_3$, $T_4$, $T_5$, $T_6$ (measuring points in rising order or arrangement as shown in FIG. 1), a "matrix" of four temperature values is obtained which are weighted or biased in various ways. For example, if the two measuring points located at the bottom are to be made a particularly great part of the array of values fed to the control circuit including controllers 8 and 9 and the two points located at the top are to form a lesser part, then an average value can be formed in accordance with the formula $$T_m = 1/6 \, (2T_3 + 2T_4 + T_5 + T_6)$$

within an appropriate connection circuit.

Figure 2:
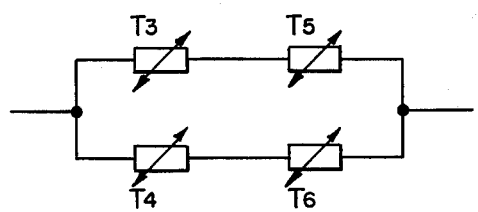
FIG. 2 shows a circuit diagram to determine an averaged temperature value $T_m$ in a reflux condenser.

An averaging procedure advantageous for control purposes also proved to be the determination of the temperature-resistance value $R_{T_m}$ to be determined according to FIG. 2 in accordance with the following formula:

$$R_{T_m} = \frac{(R_{T_3} + R_{T_5}) \cdot (R_{T_4} + R_{T_6})}{R_{T_3} + R_{T_4} + R_{T_5} + R_{T_6}}$$

This averaging can be effected by providing, according to FIG. 2, a parallel connection of respectively two temperature-measuring resistors.

Basically, the reactor temperature value can be altered, if necessary, within a minimum amount of time by changing the cooling capacity of the reflux condenser, due to the control quality of the control ciruit including the control elements 8, 9, 10, 11, and 12 and due to the constantly present amount of cold water. The warming of the reflux condenser is effected with sufficient speed by the heat of condensation of the steam. The amount of cooling water is controlled during this procedure in correspondence with the amount of heat occurring during the polymerization. In this connection, it is unnecessary to provide warm water or steam when the cooling capacity drops, in order to bring the cooling device to a higher temperature, inasmuch as the cooling power is reduced at sufficient speed by the heat of condensation.

The number of measuring points in the reflux condenser can be greatly varied. The thus-determined measuring values can be changed during the measuring step. The measuring points can be inserted and eliminated, so that it is possible to correct the averaged temperature $T_m$ by means of a suitable circuit so that the actual value $T_{m\,corr}$ is substantially directly proportional to the cooling capacity of the reflux condenser.

During a test with the reflux condenser of a 200 m³ reactor, the desired value of the reactor was adjusted abruptly to be lower by 0.5° C. As a consequence, the cooling capacity of the reflux condenser changed within two minutes to almost maximum cooling power and subsequently adjusted — after reaching the new desired temperature — to approximately the cooling capacity present before the change in desired value. In case of an increase of the desired temperature by 0.5° C., the cooling capacity was extensively reduced within two minutes, and after warming of the cooling water present in the reflux condenser, dropped to almost zero. Upon the reactor temperature approaching the set desired temperature, the cooling power adapted itself again to the reaction in the reactor.

The experiments showed furthermore that a control of the polymerization charge is possible in 200 m³ polymerization reactors to ±0.5° C., based on the site of the temperature sensor. Accordingly, a control quality can be attained which is inordinately high particularly for large reactors. Additionally this type of circuit is especially safe since, if the cooling water fed to the cooling cycle from the outside is not supplied due to failure, the water present in the reactor jacket ensures a short-term supply for the reflux condenser. In case of danger, a large amount of cold water can be fed to the reflux condenser practically without delay.

It will be understood that the controller designated by reference numerals 4, 5, 8 and 9 are signal comparing and signal generating devices which may be pneumatic, electrically or mechanically operated. As shown electrically operated comparators and signal generator are used in conjunction with the connection circuit shown in FIG. 2.

EXAMPLE

A 200 m³ polymerization reactor (height = 10 m, diameter = 5.4 m) with stirrer is equipped with a reflux condenser on the middle of the top of the reactor. The reflux condenser is of the tube bundle type having a height of about 7 m, a diameter of 1.6 m, a cooling surface of 450 m² and a cooling water content of about 4.7 m³. The cooling water enters the reflux condenser at the bottom and leaves at the top. The maximum possible flow of water through the jacket of the reflux condenser is 1100 m³/h. Within the jacket of the reflux condenser there are four temperature measuring points ($T_3$, $T_4$, $T_5$, $T_6$) in rising distances of the water inlet. $T_3$ is at a distance of 0.9 m, $T_4$ at a distance of 1.5 m, $T_5$ at a distance of 3.3 m and $T_6$ at a distance of 5.1 m from the water inlet. The temperature values of these four measuring points are averaged and fed to the controller of the coolant flow through the reflux condenser.

Vinylchloride is polymerized in the reactor following the well known emulsion polymerizing procedure. 40 metric tons of water and 10 metric tons of vinylchloride are given into the reactor. During the reaction additional vinylchloride is delivered into the reactor under a pressure according to the reaction temperature until the reactor is filled up to about 160 m³. The cooling and temperature controlling of the reactor is as follows:

After reaching the desired reaction temperature of 56° C the cooling flow through the reactor jacket is at its maximum value of 1100 m³ of water/h, the temperature of the cooling water entering the reactor jacket being 25° C. The reactor temperature is now held at its desired value of 56° C. by controlling the flow of water through the reflux condenser according to the amount of heat given off during condensation.

If the polymerization reaction is slow, as it is in the beginning of the reaction, there is only a slow flow of water through the reflux condenser, e.g. water inlet temperature 27° C. flow of water through the reflux condenser about 10 m³/h, temperatures at $T_3$ = 32.6° C. at $T_4$ = 36.9° C., $T_5$ = 44.7° C., at $T_6$ = 48.4° C. If the reaction proceeds further, reaction becomes more violent. The flow of water is now 450 m³/h, inlet temperature of the cooling water 27° C., temperatures at $T_3$ = 27.9° C., $T_4$ = 28.8° C., $T_5$ = 31.4° C., $T_6$ = 33.8° C. The desired polymerization temperature of 56° C. in the reactor is held within a range of ± 0.1° C.

What is claimed is:

1. In a process for cooling a polymerization reaction of compounds in a dispersion and/or solution with a polymerization reactor equipped with a reflux condenser, wherein the cooling is executed by evaporation of one or more liquids contained in the dispersion and/or solution, by condensation of vapors in the reflux condenser, and by recycling of the thus-condensed vapors into the reactor, and by cooling of the reactor with a controllable flow of coolant the improvement wherein a portion of said coolant is passed through said reflux condenser and the amount of heat given off during condensation in said reflux condenser provides the control variable for a controller for controlling the amount of coolant fed into the reflux condenser.

2. A process according to claim 1, wherein the amount of heat given off during condensation within said reflux condenser is determined by the temperature of the coolant within the reflux condenser and the temperature is utilized as the control variable for said controller.

3. A polymerization apparatus for conducting a polymerization reaction which comprises a polymerization reactor operatively associated with a reflux condenser, said reactor including a cooling jacket for cooling the contents of the reactor and conduit means for circulating a coolant through said cooling jacket and said reflux condenser including a cooling jacket means for cooling vapors to be condensed in a condensation chamber of the reflux condenser and means for circulating a coolant through said cooling jacket means of said reflux condenser, at least one temperature sensing means located within the coolant passing through the jacket means of said reflux condenser and a controller including control circuit means operatively associated with said at least one temperature sensing means for controlling the circulation of coolant through said reflux condenser.

4. An apparatus according to claim 3, wherein several temperature measuring sensor means are arranged one behind the other in the flow direction of the coolant within the reflux condenser, the measuring values of these sensor means being weighted averaged, and fed to the controller.

5. A process for controlling the cooling capacity of a reflux condenser operatively associated with a polymerization reactor wherein compounds in dispersion and/or solution are subjected to polymerization reactions, which comprises passing a liquid coolant through a portion of said reflux condenser to effect cooling of vapors passing through said reflux condenser from said reactor, disposing at least two temperature sensing means within the cooling passing within said reflux condenser, said sensing means being arranged at different positions one behind the other in series in a direction of flow of the coolant through said reflux condenser, measuring the temperatures of the coolant at said different positions with said sensing means, averaging the measured temperatures, feeding the averaged value of said temperatures to a controller and regulating the flow of coolant through said portion of said reflux condenser with said controller.

6. A process according to claim 5, wherein said polymerization reactor is also cooled by passing a liquid coolant through a jacket portion of said reactor, and through a controllable coolant cycle, the coolant being passed through said reflux condenser being withdrawn from said controllable cycle of said polymerization reactor.

7. A process according to claim 5, wherein four temperature measuring sensor means are arranged within the reflux condenser in the flow direction of the coolant.

8. A process according to claim 7, wherein the averaging of the measured values $T_3$, $T_4$, $T_5$, $T_6$, arranged starting with the entrance for the coolant in the flow direction of the coolant within the reflux condenser is effected with the aid of the resistance values $R_{T_3}$, $R_{T_4}$, $R_{T_5}$, $R_{T_6}$, in accordance with the equation $$R_{T_m} = \frac{(R_{T_3} + R_{T_5}) \cdot (R_{T_4} + R_{T_6})}{R_{T_3} + R_{T_4} + R_{T_5} + R_{T_6}}.$$

wherein $R_{T_3}$, $R_{T_4}$, $R_{T_5}$ and $R_{T_6}$ are resistance values corresponding respectively to the measured temperatures $T_3$, $T_4$, $T_5$ and $T_6$.

9. A process according to claim 5, wherein the weighting factors for the individual measuring values to be determined are variable during the measuring procedure.

10. A process according to claim 5, wherein individual measuring sensor means can be eliminated and/or others can be introduced into the control circuit for controlling the temperature of the reflux condenser.

11. A process according to claim 5, wherein the averaged temperature value $T_m$ fed to the controller is, by means of an additional circuit, directly proportional to the cooling capacity of the reflux condenser.

* * * * *